United States Patent
Rakshit et al.

(10) Patent No.: US 11,048,965 B2
(45) Date of Patent: Jun. 29, 2021

(54) IDENTIFICATION OF MISPLACED OBJECTS USING INTERNET OF THINGS (IOT) DEVICES

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 16/437,407

(22) Filed: Jun. 11, 2019

(65) Prior Publication Data
US 2020/0394436 A1 Dec. 17, 2020

(51) Int. Cl.
G06K 9/00 (2006.01)
G06K 9/62 (2006.01)
G10L 15/22 (2006.01)
G06F 16/583 (2019.01)
H04L 29/08 (2006.01)
G06F 3/16 (2006.01)

(52) U.S. Cl.
CPC ............ *G06K 9/6202* (2013.01); *G06F 3/16* (2013.01); *G06F 16/5854* (2019.01); *G06K 9/6267* (2013.01); *G10L 15/22* (2013.01); *H04L 67/12* (2013.01)

(58) Field of Classification Search
CPC ...... G06K 9/6202; G06K 9/6267; G06F 3/16; G06F 16/5854; H04L 67/12; G10L 15/22
See application file for complete search history.

(56) References Cited

U.S. PATENT DOCUMENTS

| | | |
|---|---|---|
| 6,847,892 B2 | 1/2005 | Zhou et al. |
| 9,734,411 B2 * | 8/2017 | Briggs ............... G06K 9/00979 |
| 9,813,605 B2 | 11/2017 | Peterson et al. |

(Continued)

FOREIGN PATENT DOCUMENTS

EP 2887258 A1 6/2015

OTHER PUBLICATIONS

Disclosed Anonymously, "Automatic Object Tracking" IP.com (Sep. 2018) IP.com No. IPCOM000255187D, pp. 1-23.

*Primary Examiner* — Dhaval V Patel
(74) *Attorney, Agent, or Firm* — Tutunjian & Bitetto, P.C.; Michael A. Petrocelli (57) ABSTRACT

A computer enabled method for locating a misplaced object that includes receiving at an object locating system a request defining an object to be located, the input data request being received audibly by a digital assistant. The method may include analyzing the request with the object locating system by classifying the object to be located with an image search of a corpus of images correlated to comparison objects; and receiving images from Internet of Thing devices (IoT) devices of search objects. The method further includes comparing the images correlated to comparison objects from the image search with images of the search objects to identify retrieval objects that match the object classified by the object locating system that analyzed the request. The location of the retrieval object is then identified.

20 Claims, 7 Drawing Sheets

(56) References Cited

U.S. PATENT DOCUMENTS

| | | |
|---|---|---|
| 2005/0231361 A1 | 10/2005 | Godbey |
| 2011/0124326 A1 | 5/2011 | Kudo |
| 2015/0358777 A1* | 12/2015 | Gupta ................... H04W 4/023 |
| | | 370/254 |
| 2016/0125587 A1* | 5/2016 | Peterson ............ H04N 5/23241 |
| | | 382/103 |
| 2017/0048376 A1 | 2/2017 | Logan |

* cited by examiner

IDENTIFICATION OF MISPLACED OBJECTS USING INTERNET OF THINGS (IOT) DEVICES

BACKGROUND

The present invention generally relates to devices that are connected to the Internet, and more particularly to employing devices that are connected to the Internet to locate missing items.

The Internet of Things is the extension of Internet connectivity into physical devices and everyday objects. Embedded with electronics, Internet connectivity, and other forms of hardware, these devices can communicate and interact with others over the Internet, and they can be remotely monitored and controlled.

SUMMARY

In accordance with an embodiment of the present disclosure, a method is disclosed to locate misplaced objects through the utilization of Internet of Things (IoT) devices to both locate the object and then highlight its location to a user through a digital assistant intermediator.

In one embodiments, the present disclosure provides a computer enabled method of locating objects in a defined area using Internet of Things (IoT) identification. In one embodiment, the computer enabled method for locating a misplaced objects includes receiving at an object locating system a request defining an object to be located, the input data request being received audibly by a digital assistant. The method may include analyzing the request with the object locating system by classifying the object to be located with an image search of a corpus of images correlated to comparison objects; and receiving images from Internet of Thing devices (IoT) devices of search objects. The method further includes comparing the images correlated to comparison objects from the image search with images of the search objects to identify retrieval objects that match the object classified by the object locating system that analyzed the request. The location of the retrieval object is then identified.

In another aspect, a system is provided for locating objects in a defined area using Internet of Thing (IoT) identification. In one embodiment, the system for locating a misplaced object or item in a defined area using IoT (Internet of Things) identification includes a request analyzer for receiving a request defining an object to be located, the request being forwarded by a digital assistant that was audibly given the request by a user; and a transceiver for receiving images from Internet of Thing devices (IoT) devices of search objects. The system further includes a visual classifier including at least one hardware processor for executing a series of instructions for analyzing the request by classifying the object to be located with an image search of a corpus of images correlated to comparison objects, comparing the images correlated to comparison objects from the image search with images of the search objects to identify retrieval objects that match the object classified by the object locating system that analyzed the request, and identifying the location of the retrieval object.

In yet another aspect, a computer program product is provided that includes a computer readable storage medium having computer readable program code embodied therein for locating objects in a defined area using Internet of Thing (IoT) identification. In one embodiment, the computer readable storage medium is non-transitory. The computer readable program code can provide the steps of registering a user to an object locating system that collects data from the user, wherein the user can revoke permission to the object locating system at any time, and receiving at the object locating system a request defining an object to be located, the input data request being received audibly by a digital assistant. The computer program code can also provide for analyzing the request with the object locating system by classifying the object to be located with an image search of a corpus of images correlated to comparison objects. Additionally, the computer program code allows for receiving images from Internet of Thing devices (IoT) devices of search objects, comparing the images correlated to comparison objects from the image search with images of the search objects to identify retrieval objects that match the object classified by the object locating system that analyzed the request, and identifying the location of the retrieval object.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In some embodiments, the disclosure provides methods, systems and computer program products that provide a method and system for locating objects in a defined area using Internet of Thing (IoT) identification.

Digital assistants offer connectivity and control of Internet of Thing (IoT) devices. The Internet of Things (IoT) is the network of physical devices, vehicles, home appliances, and other items embedded with electronics, software, sensors, actuators, and connectivity which enables these things to connect, collect and exchange data. The IoT devices can be equipped with various types of sensors to collect information about themselves and their surroundings and provide the collected information to the misplaced object locating system over a network, such as an internet connected network. The term "digital assistant" denotes a software agent that can perform tasks or services for an individual based on verbal commands. Some virtual assistants are able to interpret human speech and respond via synthesized voices. Users can ask their assistants questions, control home automation devices and media playback via voice, and manage other basic tasks such as email, to-do lists, and calendars with verbal commands. In some embodiments, the digital assistant may employ a voice response system. As will be described herein, the system that the person is interacting with is a "voice response system". As used herein, a "voice response system (VRS)" is a computer interface which responds to voice commands, instead of responding to inputs from a mouse or a keystroke. In some examples, the voice response system employs a type of speech synthesis where sentences are organized by concatenating pre-recorded words saved in a database.

The methods, systems and computer program products of the present disclosure employ the communication capabilities of Internet of Thing (IoT) devices to assist users to locate misplaced items within a given location. In some embodiments, the methods, systems and computer program products of the present disclosure can utilize Internet of Thing (IoT) devices to receive a request from a user to locate a missing object. In some embodiments, the system for locating misplaced items can identify an object a user is looking for by comparing known classifications about that object, e.g., what the object the user is looking for looked like in previously captured pictures of it. In some examples, the system for locating misplaced items can utilized connected Internet of Things (IoT) devices equipped with a camera device in the vicinity that the missing object may be present in to capture the surrounding area looking for objects that meet the classification of the missing object. In some embodiments, the system for locating missing items may utilized connected Internet of Things (IoT) devices located nearby the identified object to draw the user's attention to the location of that object that is missing through such means as a flashing light or an alarm. The systems, methods and computer program products are now described with more detail with reference to FIGS. 1-7.

Figure 1:
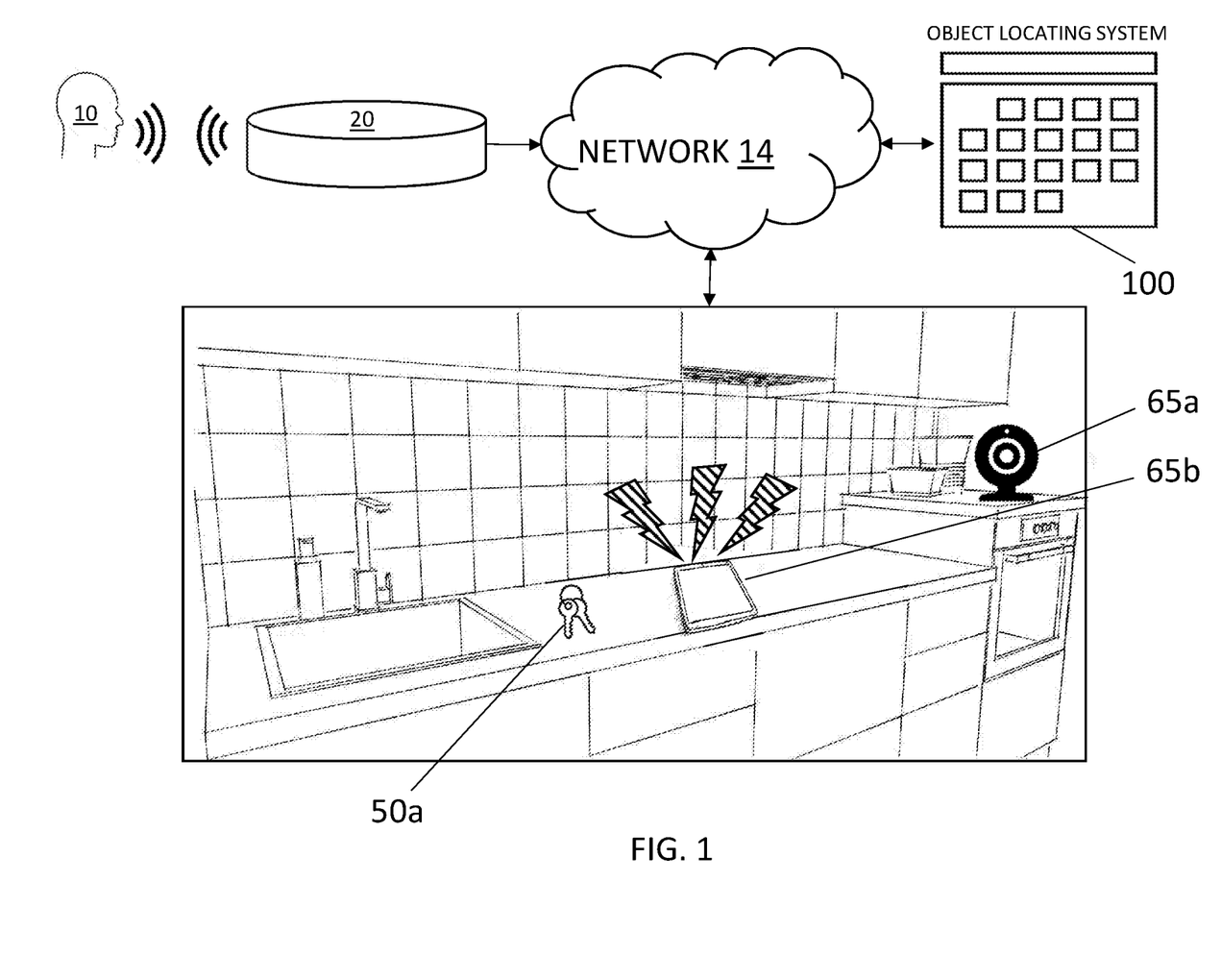
FIG. 1 is a diagram illustrating an example environment for a method and system for locating objects, e.g., keys, in a defined area, e.g., a kitchen, using Internet of Thing (IoT) identification, in accordance with one embodiment of the present disclosure.
Figure 2:
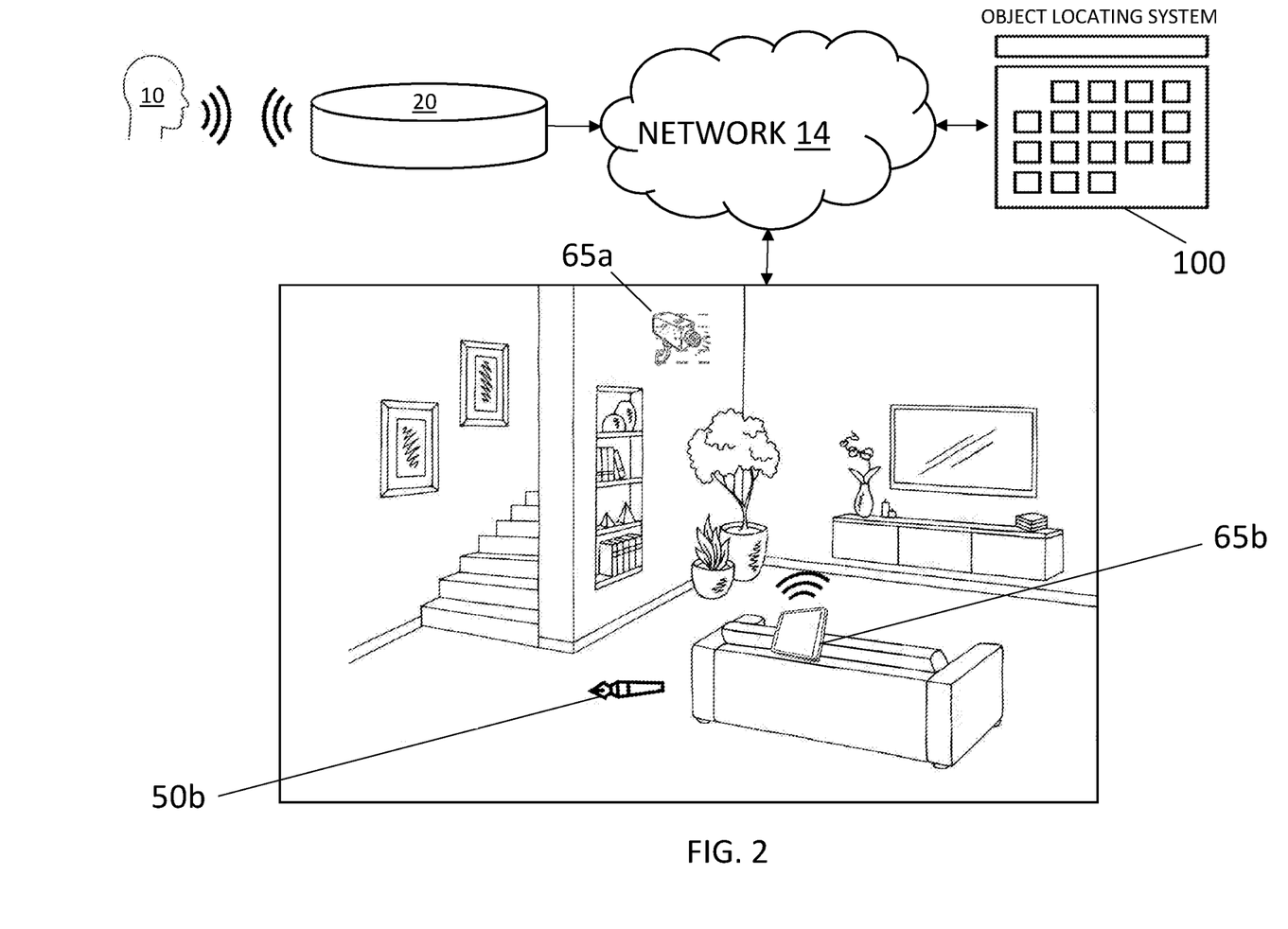
FIG. 2 is a diagram illustrating an example environment for a method and system for locating objects, e.g., a writing instrument, in a defined area, e.g., a living room, using Internet of Thing (IoT) identification, in accordance with one embodiment of the present disclosure.
Figure 3:
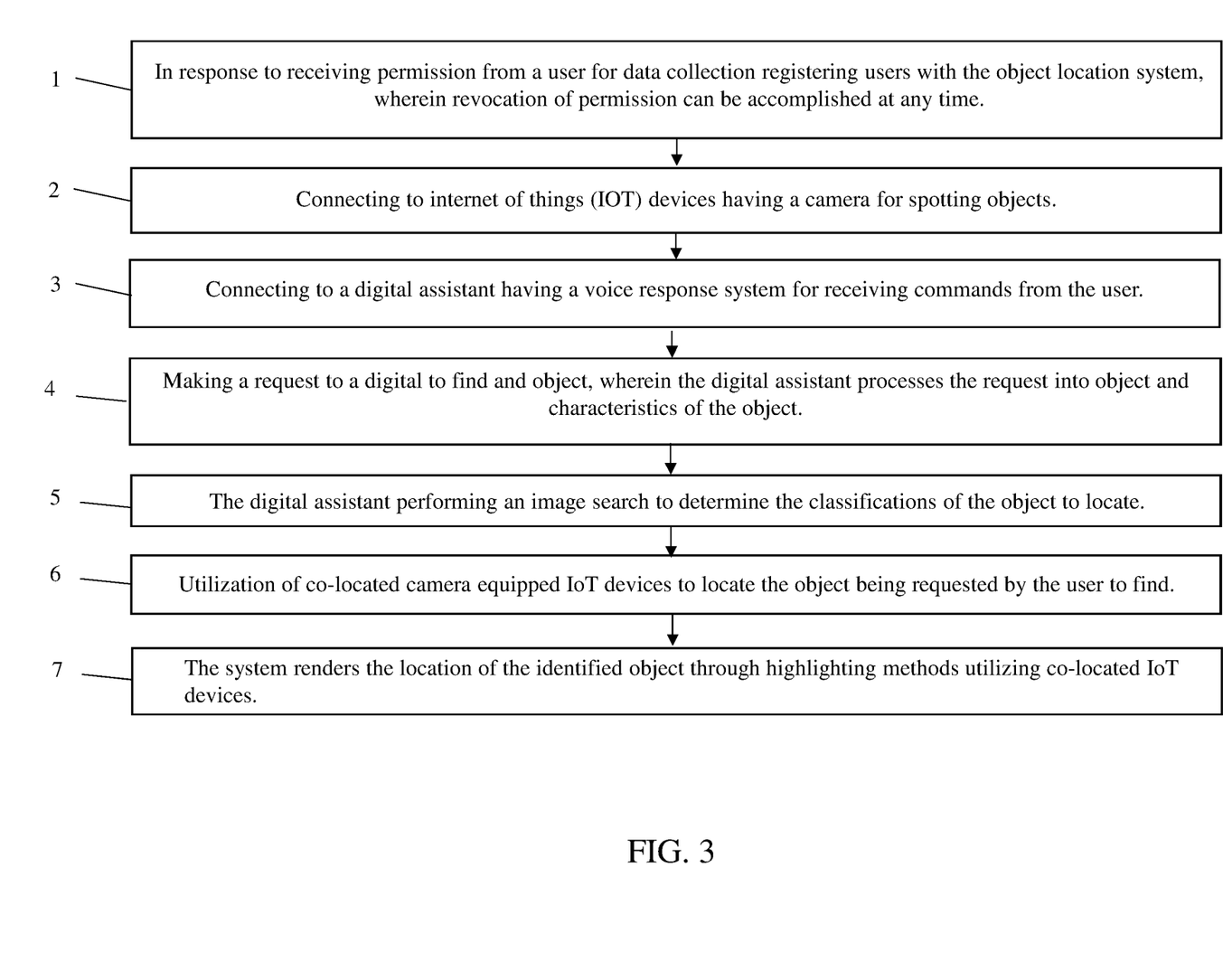
FIG. 3 is a block/flow diagram showing another embodiment of a method for locating objects in a defined area using Internet of Thing (IoT) identification, in accordance with an embodiment of the present invention.
Figure 4:
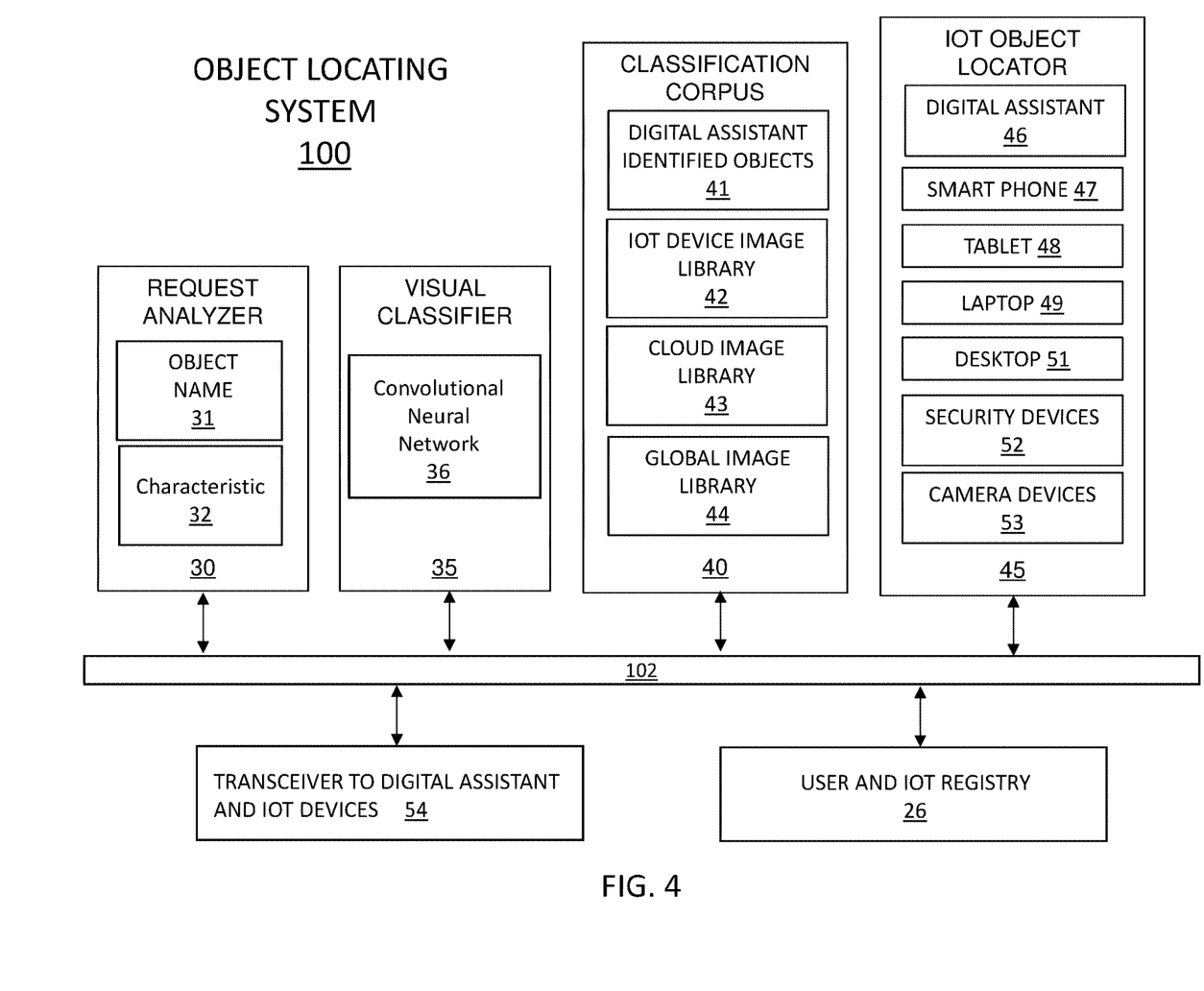
FIG. 4 is a block diagram illustrating a system for locating objects in a defined area using Internet of Thing (IoT) identification, in accordance with one embodiment of the present disclosure.

FIGS. 1 and 2 are diagrams illustrating an example environment in which the methods, systems and computer program products may be employed for locating missing objects using Internet of Things (IoT) devices. FIG. 3 is a block/flow diagram showing a method for locating missing objects using Internet of Things (IoT) devices, in accordance with an embodiment of the present invention. FIG. 4 is a block diagram illustrating one embodiment of a system for locating objects in a defined area using Internet of Thing (IoT) identification.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The methods and systems that utilize co-located Internet of Things (IoT) devices 65a fitted with cameras to identity a misplaced object 50a, 50b through use of cognitive visual recognition as triggered by a request from a digital assistant 20. In some embodiments, the methods, systems and computer program products of the present disclosure utilize Internet of Things (IoT) devices 65b nearby an identified object 50a, 50b to guide the user to that object through a means of highlighting, such as flashing of a lamp, laser pointing or pulsing, which can be accompanied by instructions from the digital assistant 20.

In some embodiments, the method may begin at block 1, which can include registering users 10 with the system for locating missing objects 100 using Internet of Things (IoT) devices 65a, 65b. The method may begin with in response to receiving permission from a user 10 for data collection, registering users 10 with the object location system 100, which provides for a method of locating a misplaced object 50a, 50b through utilization of nearby Internet of Things (IoT) devices 65a, 65b to both locate and highlight the location of a missing object 50a, 50b to the user 10.

To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Referring to block 2 of the method depicted in FIG. 1, the method may continue with registering devices (which can include establishing a connection to), such as Internet of Things (IoT) devices 65a, 65b which can include a camera for recording and/or taking images of objects 50a, 50b, with the object locating system 100. The registration of devices, such as Internet of Things devices 65a, 65b, can include devices having some mechanism by which a device can guide a user 10 to the object 50a, 50b. Connecting to the devices 65a, 65b may be over a network 14 including the internet. The object locating system 100 may employ the Internet of Things (IoT) devices 65a that include the camera to locate a missing object by taking images of the object through cameras and matching those images to the requested object by cognitive visual recognition. The object locating system 100 may also employ connected devices, such as Internet of Things device 65b, to designate (also referred to as highlighting) a missing object that has been identified by the object locating system 100. These Internet of Things (IoT) devices 65b may include a laser to point out the missing object, or a light to illuminate the missing object or illuminate the Internet of Things device 65b that is in closest proximity to the objection 50a, 50b. In some embodiments, the Internet of Things (IoT) device 65*b* may include at least one speaker for emitting sound indicating proximity to the object 50*a*, 50*b* being located by the object locating system 100.

The devices, e.g., Internet of Things (IOT) device 65*a*, 65*b*, that function to locate and/or highlight the objects 50*a*, 50*b* being located by the object locating system 100 can be intelligent systems that can gather images via video or camera devices for cognitive visual recognition. Examples of Internet of Things (IOT) devices 65*a*, 65*b* that have image taking abilities, e.g., video and/or camera picture taking, can include security cameras; baby monitors; computers with web cams; televisions with web cams, front and/or back facing cameras of mobile devices, such as smart phones and/or tablet computers; and combinations thereof. Other examples of Internet of Things (IOT) that can include a video camera for include a lightbulb, a luminaire, a lighting system, a door lock, a water heater, a sprinkler system, an air-conditioner, a thermostat, an alarm clock, a window shade, a switch, a smoke alarm, an electrical outlet, an alarm, a personal proximity sensor, a door sensor, a biometric sensor, an automotive sensor, a cooking device, an electrical breaker, a personal alert sensor, a motion sensor, a calendar, a radio, a radio frequency identification (RFID) tag/RFID detector, a vehicle, an electric vehicle charger, a distributed generator (e.g. solar panel), a distributed energy storage (e.g. battery), a thermometer, and combinations thereof.

One form of Internet of Things (IOT) 65*b* that is suitable for providing a noise to bring attention to an object 50*a*, 50*b* may include televisions and media boxes; phones and tablet computers; laptop and desktop computers; smart home devices, such as lamps, light switches, thermostats, smoke alarms, alarm clocks etc.; wearable smart devices; and combinations thereof.

One form of Internet of Things (IOT) 65*a*, 65*b* that is suitable for emitting a light and/or laser to bring attention to an object 50*a*, 50*b* may include a lightbulb; a luminaire; a lighting system; a security camera with lighting abilities; mobile smart devices, such smart phones and tablets, which may have a flash; and combinations thereof. In other embodiments, the Internet of Things (IOT) 65*a*, 65*b* that is suitable for emitting a light and/or laser to bring attention to an object 50*a*, 50*b* may include televisions, media boxes, lamps, light switches, thermostats, smoke alarms, wearable devices and combinations thereof.

In some examples, the IOT devices 65*a*, 65*b* or a hub that the IOT devices 2 are in communication with include a cellular radio to establish a connection to the Internet via a cellular service such as a 4G (e.g., Mobile WiMAX, LTE) or 5G cellular data service. Alternatively, or in addition, the IOT devices 65*a*, 65*b* or a hub that the IOT devices are in communication with include a may include a WiFi radio to establish a WiFi connection through a WiFi access point or router which couples the IOT devices 65*a*, 65*b* or IOT hub to the Internet (e.g., via an Internet Service Provider providing Internet service to the end user), which in turn connect to the locating system 100/network 14. Of course, it should be noted that the underlying principles of the invention are not limited to any particular type of communication channel or protocol, but is suitable for use with any transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In one embodiment, the IoT devices 65*a*, 65*b* are ultra-low-power devices capable of operating for extended periods of time on battery power (e.g., years). To conserve power, the local communication channels may be implemented using a low-power wireless communication technology such as Bluetooth Low Energy (LE). In this embodiment, each of the IoT devices 65*a*, 66*b* are equipped with Bluetooth LE radios and protocol stacks.

In the embodiments depicted in FIGS. 1 and 2, the IoT devices 65*a* for capturing images of objects 50*a*, 50*b* are camera's, such as security cameras or web based video cameras. In the embodiments depicted in FIGS. 1 and 2, the IoT devices 65*b* that are employed to guide users 10 to the objects 50*a*, 50*b* being located are mobile devices, such as tables, having a camera flash to emit light or having a signal LED to emit a signal directing the user to the objects 50*a*, 50*b*. In the embodiments depicted in FIGS. 1 and 2, the IoT devices 65*b* that are employed to guide users 10 to the objects 50*a*, 50*b* being located are mobile devices, such as tablet computer, having a speaker to emit sound as a signal directing the user to the objects 50*a*, 50*b*.

Referring to FIG. 3, the method can continue at block 3 with connecting a digital assistant 20 to the object locating system 100. The term "digital assistant" denotes a software agent that can perform tasks or services for an individual based on verbal commands. Some virtual assistants are able to interpret human speech and respond via synthesized voices. Generally, users can ask their assistants questions, control home automation devices and media playback via voice, and manage other basic tasks such as email, to-do lists, and calendars with verbal commands. In some embodiments, the digital assistant having voice responses system capability. As will be described herein, the system that the person is interacting with is a "voice response system". As used herein, a "voice response system (VRS)" is a computer interface which responds to voice commands, instead of responding to inputs from a mouse or a keystroke. In some examples, the voice response system employs a type of speech synthesis where sentences are organized by concatenating pre-recorded words saved in a database.

In some embodiments, the IOT devices 26*a*, 26*b* or a hub that the IOT devices 26*a*, 26*b* are in communication with the network 14 to the object locating system 100 by a connection via a WiFi radio to establish a WiFi connection through a WiFi access point or router which couples the IOT devices 26*a*, 26*b* or IOT hub to the Internet (e.g., via an Internet Service Provider providing Internet service to the end user), which in turn connect to the locating system 100/network 14. In other embodiments, the digital assistant 20 is in communication with include a cellular radio to establish a connection to the Internet via a cellular service such as a 4G (e.g., Mobile WiMAX, LTE) or 5G cellular data service. Of course, it should be noted that the underlying principles of the invention are not limited to any particular type of communication channel or protocol.

Referring to FIG. 4, the registration of the users 10 and the Internet of Things (IoT) devices 65*a*, 65*b* to the object locating system 100 may be through a transceiver 54 of the object locating system 100. The registration data for the user 10 and the Internet of Things (IoT) devices 65*a*, 65*b* may be saved in memory, such as hardware memory, in the object locating system 100. The memory for storing the registration data for the user 10 and Internet of Things (IoT) devices is identified by the block having reference number 26 in FIG. 4.

Referring to FIG. 3, the method may continue at block 4 with the user 10 making a request to the object location system 100 to find an object 50a, 50b, wherein the user 10 makes a request through a digital assistant 20. In some embodiments, the user 10 can issue an audible request to a digital assistant 20 to locate an object 50a, 50b. For example, the digital assistant 20 can be a standalone device, such as a standalone device capable or taking voice commands and audibly responding, e.g., a stand along device having a voice response system, or the digital assistant 20 can be embedded into a smart device, such as a phone, a watch, a camera, a computer, a home appliance, a thermostat, or a combination thereof.

In some embodiments, the digital assistant 20 processes the request. For example, referring to FIG. 1, the digital assistant 20 may receive the command "digital assistant, where are my car keys?". In this example, the request from the user 10 is deconstructed into a "trigger word", such as "digital assistant"; an "object word", such as "keys"; and a "characteristic word", such as "car". In another example, referring to FIG. 2, the digital assistant 20 may receive the command "digital assistant, where is my blue pen?". In this example, the request from the user 10 is deconstructed into a "trigger word", such as "digital assistant"; an "object word", such as "pen"; and a "characteristic word", such as "blue". Referring to FIG. 4, to process the request, the object locating system 100 may employ a request analyzer 30, which can include at least one hardware processor for executing a set of instructions saved in a form of memory, such as hardware memory. For example, the request analyzer 30 can break a query down to object words and characteristic words. The object 31 may be a type of item to be searched, e.g., a material thing that can be seen or touched, whereas a characteristic 32 is feature or quality belonging to the object and serving to identify it. The object word 31 and the characteristic word 32 may be stored in a form of memory, such as hardware memory.

Referring to FIGS. 3 and 4, the method may continue at block 5 with the digital assistant 20 performing an image search to determine the classifications of the object to locate. The image search may employ image search locations within a classification corpus 40. Image search locations can include digital assistant identified objects 41, an image library of nearby Internet of Thing (IoT) devices 42, a cloud image library 43, a global image library 44, and combinations thereof. Each of these types of image search locations may include data saved in memory, such as hardware memory. In one embodiment, the digital assistant identified objects include a search of objects previously visually captured by the digital assistant 20. For example, if the digital assistant 20 has sought and found this object, the object locating system 100 would have a prior recorded event that could be used to locate the object again, which would be stored in the memory identified as digital assistant identified objects 41.

The image library of nearby IoT devices 42 is a database of visual recognition and classification of images captured by nearby IoT devices 65a, 65b, such as pictures taken on a nearby smart phone or smart watch of the area. For example, has the user 10 can take a picture in the rooms depicted in FIGS. 1 and 2. In the example depicted in FIG. 1, a picture taken by the IoT devices 65a, 65b may include the car keys 50a. In the example depicted in FIG. 2, a picture taken by the IoT devices 65a, 65b may include the blue pen 50b.

The cloud image library 43 includes the visual recognition and classification of images stored in a cloud repository belonging to the user profile 10 assigned to the digital assistant 20.

The global image library 44 includes the visual recognition and classification of images stored in a global image repository. For example, the global image library 44 may retrieve the characteristics of a sampling of objects to be located to a repository for a group, i.e., plurality of users.

Referring to FIGS. 3 and 4, the method may continue at block 6, which includes the utilization of co-located camera equipped IoT devices 65a, 65b to locate the object 50a, 50b being requested by the user 10 to find. In some embodiments, with the object 50a, 50b to locate classified in block 5, this stage utilizes co-located IoT devices 65a, 65b fitted with cameras to locate the classified object 50a, 50b. Participating IoT devices 65a, 65b equipped with cameras in the co-located area, e.g., the settings depicted in FIGS. 1 and 2, of the request by the user 10 are sent a request to enable the camera and capture footage. For example, participating and co-located IoT security cameras, baby monitors, desktop computers with web cams, TVs with web cams, front and back facing cameras on mobile devices all capture a photograph of the area, i.e., the settings depicted in FIGS. 1 and 2. In some embodiments, a security profile can be created defining which devices enable permission to capture in this photograph capture and in which context.

Referring to FIG. 4, the object locating system 100 may include an IoT objector locator 45 to perform the steps described at block 6. The IoT objector locator 45 receives images from the TOT devices 65a, 65b, and can store the images in memory, e.g., hardware memory. The databases stored in the TOT objector locator 45 can include a stored database for each IoT device 65a, 65b being used to image rooms in locating the object 50a, 50b. For example, the IoT objector locator 45 may include storage for images collected for a digital assistant database 46, a smart phone database 47, a tablet database 48, a laptop database 49, a desktop database 51, a security device database 52, and a camera device database 53.

Referring to FIGS. 3 and 4, the photographs captured by the co-located IoT devices 65a, 65b are analyzed by a visual recognition service, e.g., Convolutional Neural Network (CNN) 36, of a visual classifier 35 for comparing to the classifications to the object 50a, 50b being sought (for example the object type of "keys" and the characteristic of "car", as depicted in FIG. 1, or the object type of "pen" and the characteristic of "blue", as depicted in FIG. 2). The visual classifier 35 may include at least one hardware processor for executing a set of instructions for matching images, e.g., photographs, taken by the co-located devices 65a, 65b to the classifications of the object to locate from block 5 of the method. The set of instructions may be stored on a form of memory, such as hardware memory, e.g., ram. The set of instructions may include instructions for the visual recognition service. As for the visual recognition service. This is a service that utilizes a Convolutional Neural Network (CNN) 36 to provide image classification. The CNN analyzes portions of an image to create 3D depth layers from the red-green-blue encoding of the image segment. The CNN analyzes a square matrix of the image looking for known classifications that match this portion of the depth layer. In this way a CNN can classify a given object to derive that the 3D depth layer being analyzed correlates to the image of a portion of keys (as depicted in FIG. 1), a pen (as depicted in FIG. 2), a chair, a desk, and so forth.

Referring to FIG. 3, if an object 50a, 50b matching the requested classification is found, the method flow may proceed to block 7. In some embodiments, at block 7 the method may include rendering the location of the identified object 50a, 50b through highlighting methods utilizing co-located IoT devices 65a, 65b. In some embodiments, the highlighting method used depends upon the available IoT devices 65a, 65b in the location (e.g., the settings depicted in FIGS. 1 and 2) and stated user preferences (a stated user preference for one highlighting method over another). In one embodiments, the highlighting methods can include a light emitting diode (LED) light. For example, an LED connected light, which is an example of an IoT device 65a, 65b, located nearby the object is sent a message to change color and flash, indicating the nearby location of the object to locate. For example, the LED light receives a request to change the color to red and to flash. In another embodiment, the lighting method can include laser diodes. For example, a laser diode fitted into an IoT light bulb, which is an example of an IoT device 65a, 65b, in the ceiling can be redirected to point a laser light directly at the object 50a, 50b to be located. In yet another embodiment, the highlighting methods can include a sound pulse. For example, a nearby device, e.g., IoT device 65a, 65b, can emit a sound to guide the user 20 to the object 50a, 50b to be located. For example, a speaker or tablet 65b nearby to the object 50a, 50b can emit a pulsing sound to direct the user 20 to the object 50a, 50b.

In some embodiments, in addition to the highlighting methods, the object locating system 100 can direct the digital assistant 20 to respond to the user 10 with instructions to locate the object 50a, 50b to be found and the highlighting method used. For example, referring to FIG. 1, the digital assistant 20 may state to the user "the car keys are located to the left of the tablet sounding an alarm noise". For example, referring to FIG. 2, the digital assistant 20 may state to the user "the blue pen is located to the left of the tablet sounding an alarm noise".

FIG. 4 is a block diagram illustrating a system for locating objects in a defined area using Internet of Thing (IoT) identification, in accordance with one embodiment of the present disclosure. Some of the elements that have been described above with reference to FIG. 4 have been described as employing a processor, such as a hardware processor, and a form of memory, such as hardware, memory to perform functions. A hardware processor, or "micropro­cessor," is a chip that resides in computers and other electronic devices. The processor is to receive input and provide the appropriate output. The hardware memory may include a random access memory (RAM) device, a read-only memory (ROM) device, an erasable programmable read-only memory (EPROM or Flash memory) device, a static random access memory (SRAM) device and combinations thereof.

Each of the components for the response system 100 that is depicted in FIG. 4 may be interconnected via a system bus 102.

Any of the systems or machines (e.g., devices) shown in FIG. 4 may be, include, or otherwise be implemented in a special-purpose (e.g., specialized or otherwise non-generic) computer that has been modified (e.g., configured or pro­grammed by software, such as one or more software mod­ules of an application, operating system, firmware, middle­ware, or other program) to perform one or more of the functions described herein for that system or machine. For example, a special-purpose computer system able to imple­ment any one or more of the methodologies described herein is discussed above with respect to FIG. 3, and such a special-purpose computer may, accordingly, be a means for performing any one or more of the methodologies discussed herein. Within the technical field of such special-purpose computers, a special-purpose computer that has been modi­fied by the structures discussed herein to perform the func­tions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 5:
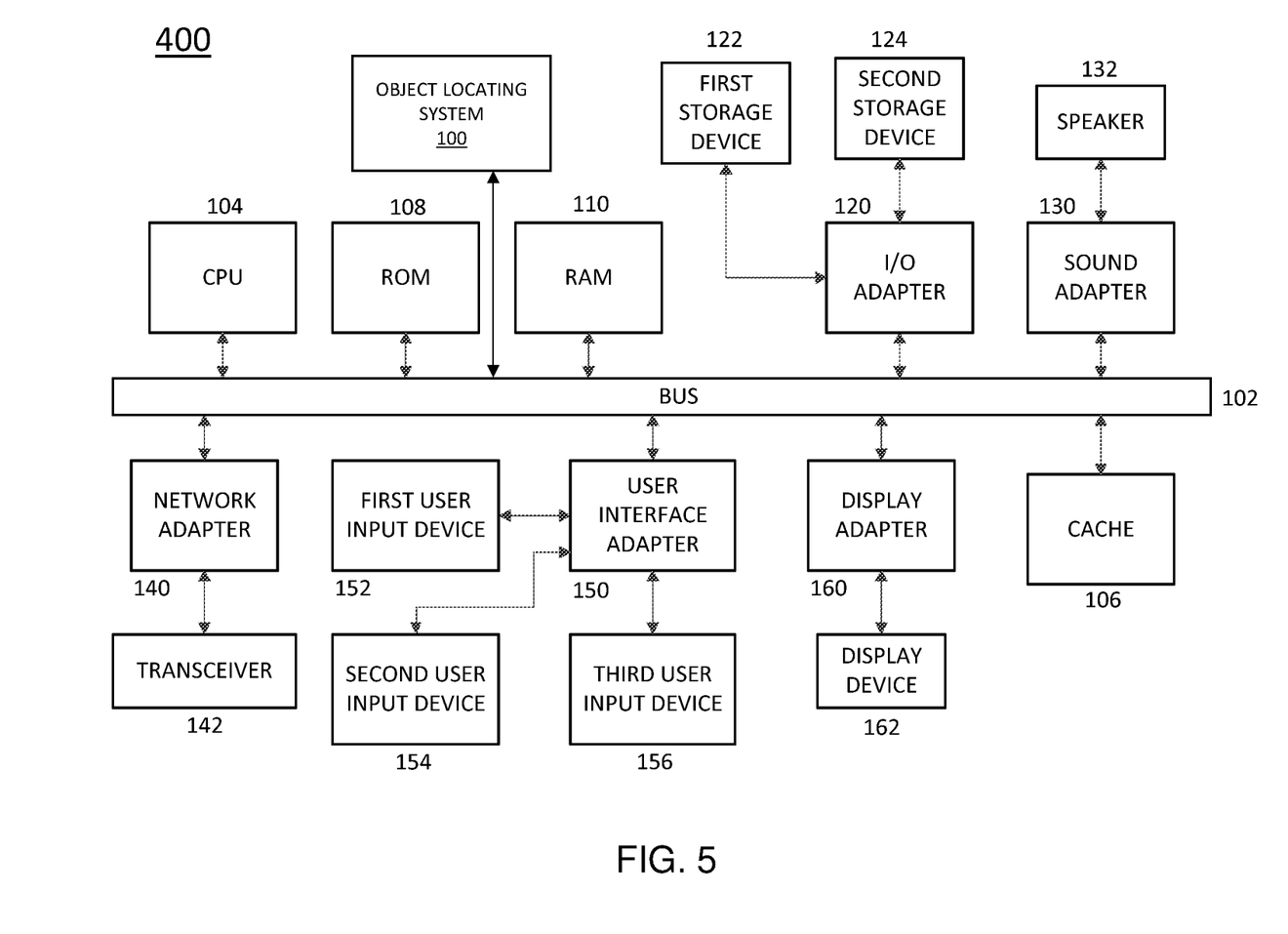
FIG. 5 is a block diagram illustrating a system that can incorporate the system depicted in FIG. 4 for performing a method for locating objects in a defined area using Internet of Thing (IoT) identification, in accordance with one embodiment of the present disclosure.

The locating system 100 may be integrated into the processing system 400 depicted in FIG. 5. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily under­stood by one of ordinary skill in the art. For example, various types of wireless and/or wired input and/or output devices can be used. Moreover, additional processors, con­trollers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product comprising a non-transitory computer readable storage medium having computer readable program code embodied therein for locating a misplaced object. The computer readable program code can provide the steps of registering a user to an object locating system that collects data from the user, wherein the user can revoke permission to the object locating system at any time, and receiving at the object locating system a request defining an object to be located, the input data request being received audibly by a digital assistant. The computer program code can also provide for analyzing the request with the object locating system by classifying the object to be located with an image search of a corpus of images correlated to comparison objects. Additionally, the computer program code allows for receiving images from Internet of Thing devices (IoT) devices of search objects, comparing the images correlated to comparison objects from the image search with images of the search objects to identify retrieval objects that match the object classified by the object locating system that analyzed the request, and identifying the location of the retrieval object.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
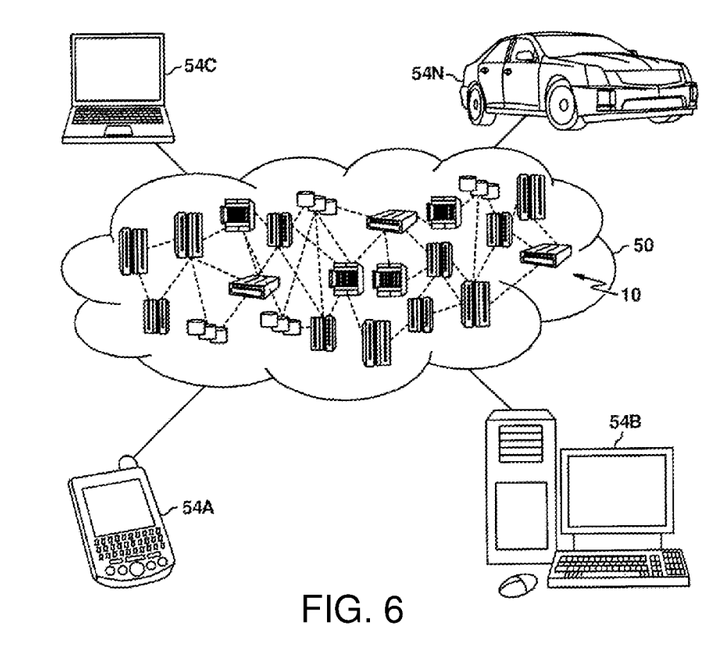
FIG. 6 depicts a cloud computing environment according to an embodiment of the present disclosure.

Referring now to FIG. 6, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 51 and cloud computing environment 50 can communicate with any type of computerized device over any type of network and/or network addressable connection (e.g., using a web browser).

Figure 7:
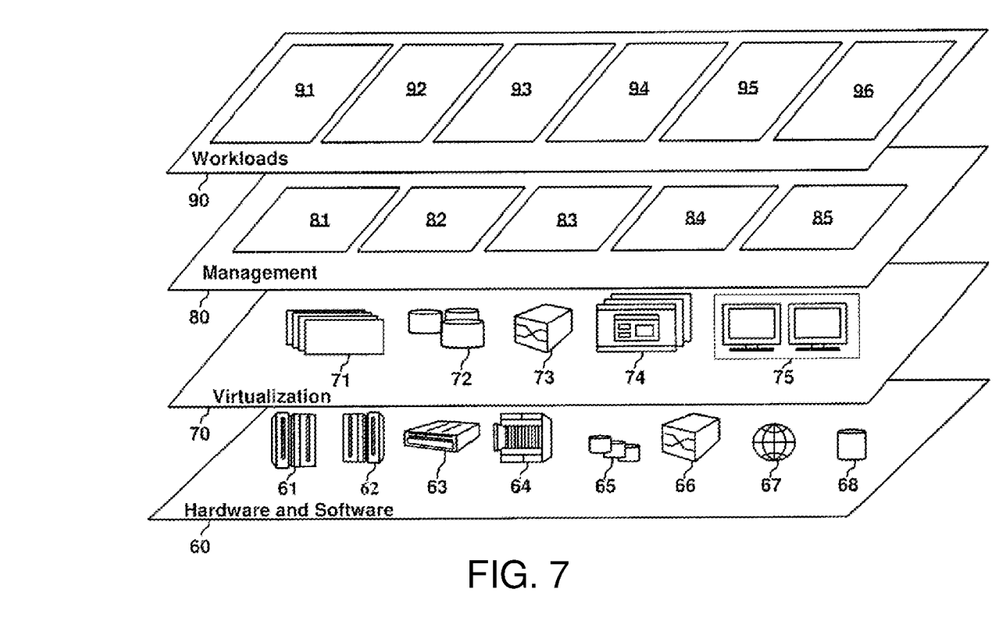
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the object locating system 100, which is described with reference to FIGS. 1-7.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of identification of misplaced objects using internet of things (JOT) devices (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer enabled method for locating a misplaced object comprising:

registering a user to an object locating system that collects data from the user, wherein the user can revoke permission to the object locating system at any time;

receiving at the object locating system a request defining an object to be located, the request being received audibly by a digital assistant;

analyzing the request with the object locating system by classifying the object to be located with an image search of a corpus of images correlated to comparison objects;

receiving images from Internet of Thing devices (IoT) devices of search objects;

comparing the images correlated to comparison objects from the image search with images of the search objects to identify retrieval objects that match the object classified by the object locating system that analyzed the request; and identifying the location of the retrieval object.

2. The computer implemented method of claim 1, wherein the input data request further comprises a possible location of the object.

3. The computer implemented method of claim 1, wherein the digital assistant receives instructions from the user and provides an audible output to the user to an answer the request.

4. The computer implemented method of claim 1, wherein the image search comprises searching images captured by the digital assistant, searching images captured by IoT devices, searching cloud image libraries, searching global image libraries or combinations thereof.

5. The computer implemented method of claim 1, wherein the comparing of the images correlated to the comparison objects from the image search with images of the search objects to identify retrieval objects comprises a convolutional neural network.

6. The computer implemented method of claim 1, further comprising the digital assistant audibly communicating the location of the classified object to the user.

7. The computer implemented method of claim 5, wherein the digital assistant is provided commands to said audibly communicate the location of the classified object from the object locating system.

8. The computer implemented method of claim 1, wherein the identifying the location of the retrieval object is provided by a signal from an Internet of Things (IoT) device that is proximate to the retrieval object.

9. The computer implemented method of claim 8, wherein the signal may be provided by a sound or an application of light.

10. A system for locating a misplaced object or item in a defined area using IoT (Internet of Things) identification comprising:

a request analyzer for receiving a request defining an object to be located, the request being forwarded by a digital assistant that was audibly given the request by a user;

a transceiver for receiving images from Internet of Thing devices (IoT) devices of search objects; and a visual classifier including at least one hardware processor for executing a series of instructions for analyzing the request by classifying the object to be located with an image search of a corpus of images correlated to comparison objects, comparing the images correlated to comparison objects from the image search with images of the search objects to identify retrieval objects that match the object classified by the object locating system that analyzed the request, and identifying the location of the retrieval object.

11. The system of claim 10, wherein the request further comprises a possible location of the object.

12. The system of claim 10, wherein the transceiver further receives instructions from the digital assistant, wherein the transceiver provides an audible output to the user to answer the request.

13. The system of claim 10, further comprising a classification corpus that the image search searches, the image search comprising searching images captured by the digital assistant, searching images captured by IoT devices, searching cloud image libraries, searching global image libraries or combinations thereof.

14. The system of claim 10, wherein the comparing of the images correlated to the comparison objects from the image search with images of the search objects to identify retrieval objects comprises a convolutional neural network.

15. The system of claim 10, wherein the identifying the location of the retrieval object is provided by a signal from an Internet of Things (IoT) device that is proximate to the retrieval object.

16. The system of claim 10, wherein the signal may be provided by a sound or an application of light.

17. A computer program product comprising a computer readable storage medium having computer readable program code embodied therein for locating a misplaced object or item in a defined area using IoT (Internet of Things) identification, the method comprising:

registering a user to an object locating system that collects data from the user, wherein the user can revoke permission to the object locating system at any time;

receiving at the object locating system a request defining an object to be located, the request being received audibly by a digital assistant;

analyzing the request with the object locating system by classifying the object to be located with an image search of a corpus of images correlated to comparison objects;

receiving images from Internet of Thing devices (IoT) devices of search objects; and comparing the images correlated to comparison objects from the image search with images of the search objects to identify retrieval objects that match the object classified by the object locating system that analyzed the request; and identifying the location of the retrieval object.

18. The computer program product of claim 17, wherein the request further comprises a possible location of the object.

19. The computer program product of claim 18, wherein the identifying the location of the retrieval object is provided by a signal from an Internet of Things (IoT) device that is proximate to the retrieval object.

20. The computer program product of claim 19, wherein the signal may be provided by a sound or an application of light.

* * * * *